Figure 1:
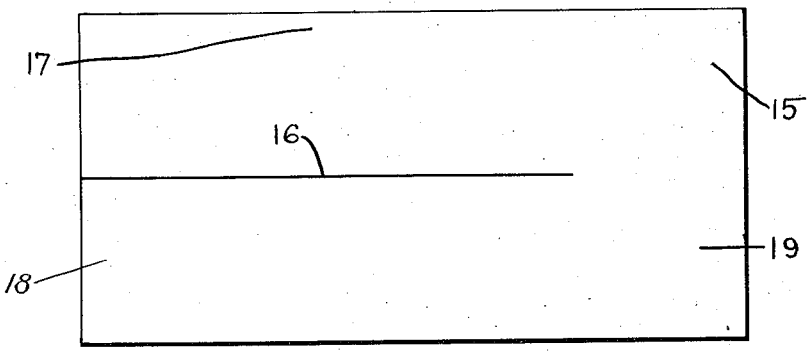

E. E. JOHNSON.
METHOD OF MAKING COUPLINGS.
APPLICATION FILED DEC. 1, 1916.

1,369,975.

Patented Mar. 1, 1921.
2 SHEETS—SHEET 1.

Inventor:
Edward E. Johnson
By P.G. Whiteley
his Attorney.

E. E. JOHNSON.
METHOD OF MAKING COUPLINGS.
APPLICATION FILED DEC. 1, 1916.
1,369,975.
Patented Mar. 1, 1921.
2 SHEETS—SHEET 2.
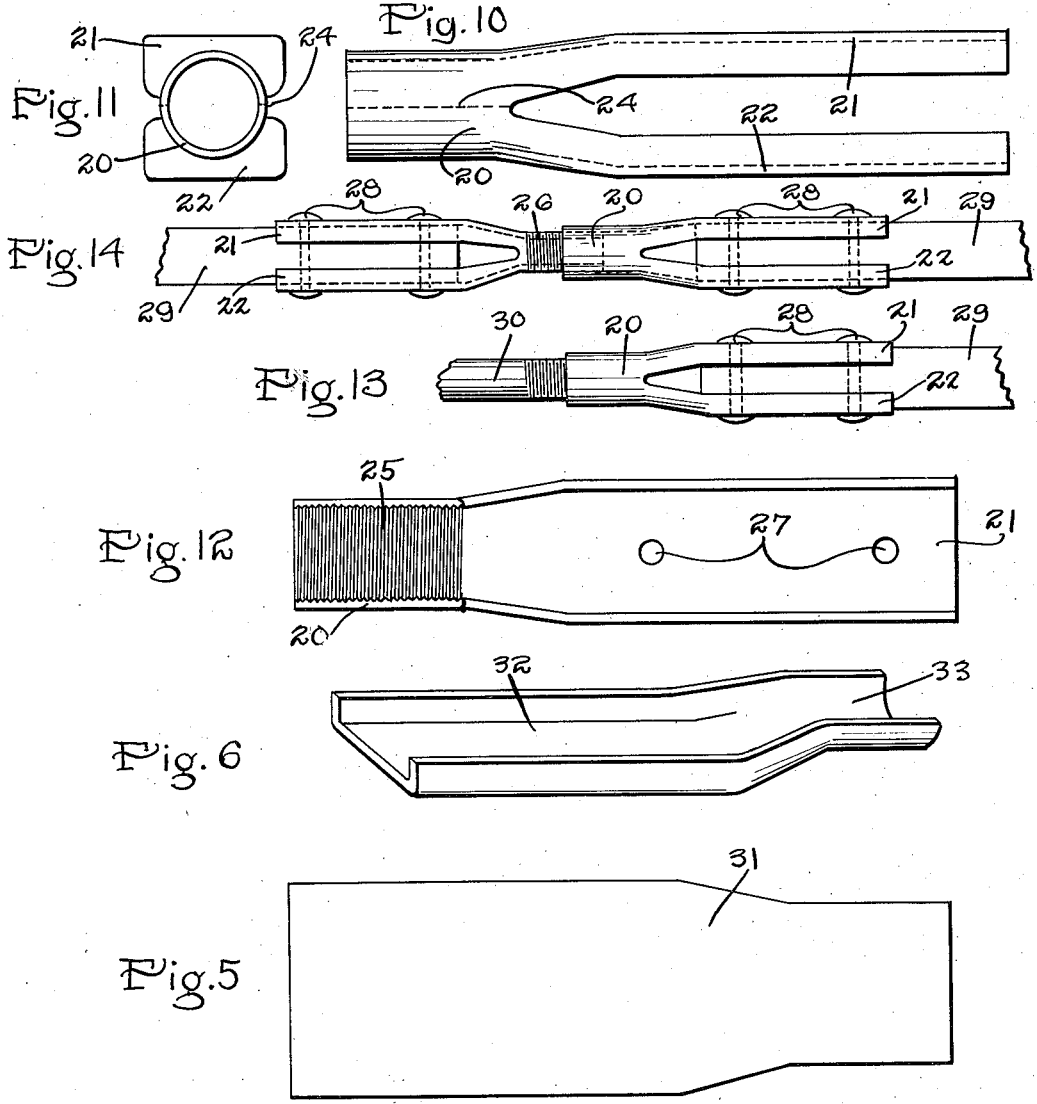
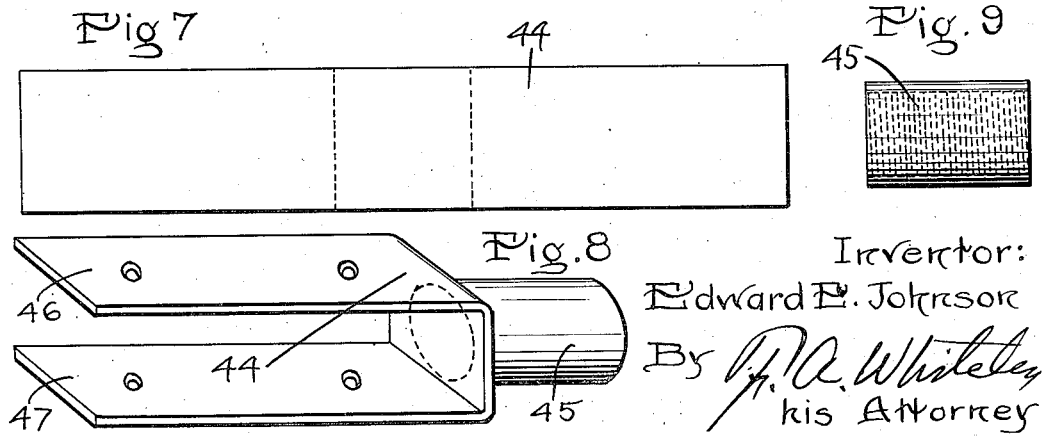
Inventor:
Edward E. Johnson
By his Attorney

UNITED STATES PATENT OFFICE.

EDWARD E. JOHNSON, OF ST. PAUL, MINNESOTA.

METHOD OF MAKING COUPLINGS.

1,369,975.   Specification of Letters Patent.   Patented Mar. 1, 1921.

Application filed December 1, 1916. Serial No. 134,475.

*To all whom it may concern:*

Be it known that I, EDWARD E. JOHNSON, a citizen of the United States, residing at St. Paul, in the county of Ramsey and State of Minnesota, have invented certain new and useful Improvements in Methods of Making Couplings, of which the following is a specification.

My invention relates to methods of making couplings, and has for its object to provide a coupling for wooden pump rods formed of sheet metal and having a sheet metal part for clasping and being secured to the wooden rod or shaft and a cylindrical portion (threaded either externally or internally) integrally united to the clasping portion.

The method of my invention comprises operating upon a single strip or strips of sheet metal to form the same by die pressing, punching or otherwise into a shaft-clasping portion and a cylindrical thread-carrying portion, thereafter uniting the edges of the thread-carrying portion by welding or other suitable means into an integral cylindrical member and threading the same internally or externally, as may be desired.

The article resulting from this method comprises a sheet metal member having wings or clasping portions adapted to receive the end of a wooden pump rod and be riveted thereto, and having a cylindrical or tubular portion integrally united with said clasping portions and throughout the circumference of the cylindrical portion which is externally or internally threaded, a pair of such members having the cylindrical portions complementally formed, one being externally threaded and the other internally threaded, comprising a complete coupling device.

The full objects and advantages of my invention will appear in connection with the detailed description thereof and are particularly pointed out in the claims.

In the drawings, illustrating the application of my invention—

Figure 2:
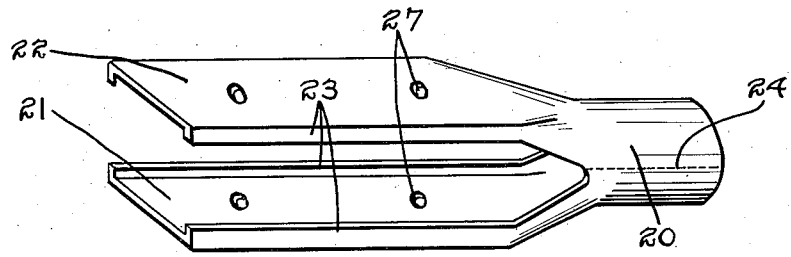
Figure 3:
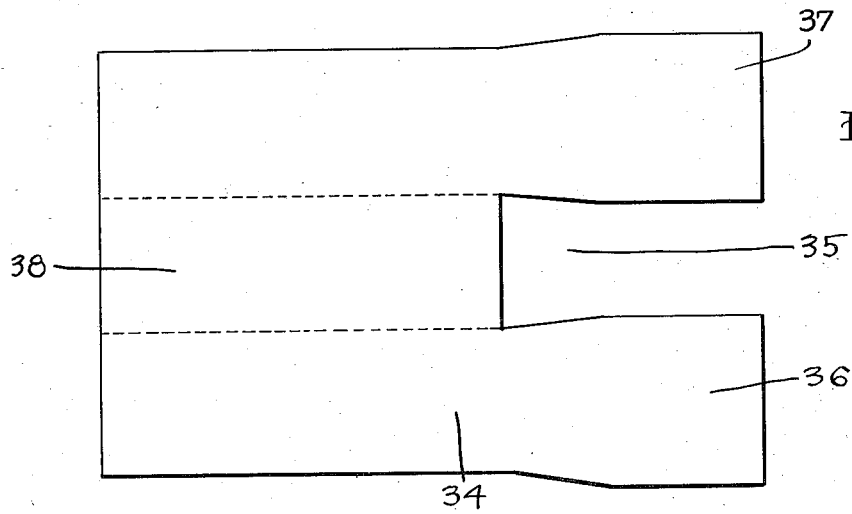
Figure 4:
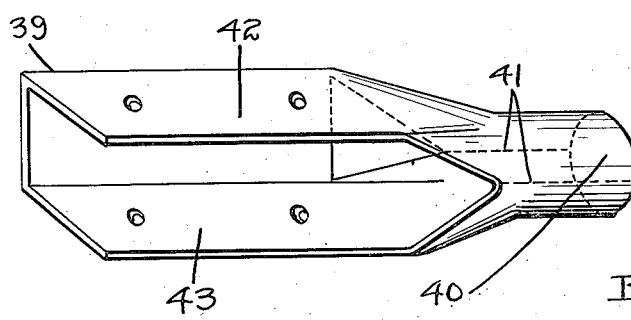

Figure 1 is a view of a blank of sheet metal cut and ready for formation. Fig. 2 shows the resulting coupling member made by stamping and shaping the blank of Fig. 1 and integrally uniting by welding or otherwise the cylindrical portion thereof. Figs. 3 and 4 are similar views showing another form of blank and resulting coupling member. Figs. 5 and 6 illustrate a blank and a member formed therefrom which will comprise a half of one of said coupling members when united therewith. Figs. 7, 8 and 9 illustrate the manner of making the clasping portion out of one piece of metal and the threaded portion out of another and uniting the same to form the complete article. Fig. 10 is a side view and Fig. 11 an end view of the coupling member shown in Fig. 2. Fig. 12 illustrates a section of a coupling which is formed by putting together two of the members shown in Fig. 6. Fig. 13 shows the manner of using the coupling for connecting a wooden rod and an iron rod. Fig. 14 shows the manner of using the coupling for connecting two wooden rods.

In the practice of my invention as shown in Figs. 1 and 2, a blank 15 is first cut from sheet metal with a slit 16 therein providing two separated pieces 17 and 18 and a connected portion 19. By stamping, pressing or otherwise the portion 19 is formed into a cylindrical member 20 and the portions 17 and 18 into parallel clasping members 21 and 22, having inwardly-turned edges 23 for clasping a rectangular wooden rod. The metal along the opening 24 comprising the meeting edges of the portion 19 is then integrally united, preferably by welding, forming a perfect closed cylinder to which the clasping members 21 and 22 are integrally attached. This member may be internally threaded as indicated at 25 in Fig. 12, or externally threaded as indicated at 26 in Fig. 14. Holes 27 in the clasping members 21 and 22 are adapted to receive rivets 28 which secure the wooden shaft 29 to the coupling member. It is to be noted that the internally-threaded cylindrical portion 20 of one coupling member is made sufficiently large relative to the externally-threaded portion 26 of another coupling member so that these two members will constitute a complemental pair or couple, the externally-threaded member being adapted to screw into the internally-threaded member as shown in Fig. 14. Also as shown in Fig. 13, an iron rod 30 may be screwed into an internally-threaded cylindrical portion 20 for connection of an iron rod with a wooden rod, which is frequently of great advantage where wooden rods have been in use and it is desirable to connect to an iron rod.

A construction in all respects similar to that of Figs. 2, 10 and 11 may be made by stamping from separate blanks 31 complemental clasping portions 32 corresponding to the clasping portions 21 and 22 of cylinder portion 20 illustrated in Figs. 2, 10 and 11 and corresponding halves 33 of the tubular portions, and thereafter bringing the half cylinders 33 into juxtaposition and welding them along the edge lines thereof. The resulting article will be operatively the same as that of Fig. 2.

As shown in Figs. 3 and 4, an effective construction may be made from a strip of metal 34 by cutting away a portion as indicated at 35, leaving two separated ears 36 and 37 and a larger contiguous portion 38. The portion 38 may, by die-stamping or otherwise, be formed into a three-sided rectangle, indicated at 39, and integrally connected with a tubular portion 40 which is formed of the two ears 36 and 37 which have their edges brought together as indicated in dotted lines at 41 and made integral by welding. This is a very strong construction in which the side clasping members 42 and 43 are integrally connected along one edge of each and, of course, are integrally connected with the cylindrical portion 40, which will be internally or externally threaded as desired to form a complemental pair or couple for connecting the adajcent ends of wooden rods.

As illustrated in Figs. 7, 8 and 9 a strip of metal 44 may be formed into a U-piece of which the sides 46 and 47 comprise clasping members. A cylinder 45 may be formed of another strip of metal having the meeting edges thereof welded together, and this cylinder is welded to the base of the U member as indicated in Fig. 8 and is thereafter internally or externally threaded as desired to form complemental pairs for connecting adjacent ends of wooden rods.

The advantages of my invention have been fairly well pointed out in connection with the description thereof. Primarily the practice of this invention makes it practicable to provide particularly strong and effective coupling members for wooden pump rods and similar devices which are light and cheap to make because formed of sheet metal instead of castings, as has been done in the past; and which for the same reason are less liable to break or fail in use as the rolled or drawn sheet metal is tough and ductile enough to permit considerable flexure without breaking.

I claim:

1. The method of making couplings for pump rods which consists in cutting a blank from sheet metal, forming a portion of the blank into a flat longitudinally extending wing, bringing the longitudinal edges of another portion of the blank together to form a tubular member, welding said edges together, and threading said tubular member.

2. The method of making couplings for pump rods which consists in cutting a blank from sheet metal, forming a portion of the blank into a pair of longitudinally extending wings spaced from each other, bending another portion of the blank to form a tubular member having longitudinally meeting edges, welding said edges together and threading said tubular member.

3. The method of making couplings for pump rods which consists in cutting a blank from sheet metal, cutting the blank longitudinally for part of its length, forming a portion of the blank into a pair of flat longitudinally extending wings spaced from each other, bending another portion of the blank to form a tubular member having longitudinally meeting edges, welding said edges together, and threading said tubular member.

4. The method of making couplings for pump rods which consists in cutting a blank from sheet metal, cutting the blank longitudinally for a part of its length, forming the longitudinally cut blank portion into a pair of flat longitudinally extending wings spaced from each other, bending the other blank portion to form a tubular member having longitudinally meeting edges, welding said edges together and threading said tubular member.

In testimony whereof I affix my signature.

EDWARD E. JOHNSON.